Aug. 24, 1965

R. W. WELLS ETAL 3,202,883

ELECTRICAL CIRCUITS PARTICULARLY FOR
USE WITH TEMPERATURE DETECTORS

Filed June 7, 1961

INVENTOR
RALPH WESTON WELLS
PETER RIPPON CHEN
BY
Mason, Mason & Albright
ATTORNEYS

United States Patent Office 3,202,883
Patented Aug. 24, 1965

3,202,883
ELECTRICAL CIRCUITS PARTICULARLY FOR
USE WITH TEMPERATURE DETECTORS
Ralph W. Wells, Tilehurst, near Reading, and Peter R. Chen, Thorpe Lea, Egham, England, assignors of one-half to Graviner Manufacturing Company Limited, and one-half to Wilkinson Sword Limited, both of London, England, and both British companies
Filed June 7, 1961, Ser. No. 115,534
10 Claims. (Cl. 317—132)

This invention relates to electrical circuits. More particularly the invention relates to novel interrogation circuits whose output can be connected to means which are capable of being charged electrically only under predetermined conditions, in order to determine the existence or otherwise of those predetermined conditions.

One example of the use of interrogation circuits which are in accordance with the present invention is to interrogate temperature responsive devices of the kind which are capable of receiving a substantial electrical charge when at or above a predetermined elevated temperature, the ability to receive the substantial charge from the interrogation circuit being indicative of the fact that the temperature responsive device is at or above said predetermined temperature. Examples of temperature responsive devices which may be interrogated in this way by electrical circuits in accordance with the invention comprise cable-like elements having an elongated inner electrical conductor, a tubular electrically conductive sheath surrounding said inner conductor, and a glass filling within said sheath, said glass having an electrical resistance which falls with rising temperature. In order to prevent contact between the inner conductor and the sheath when the glass softens at elevated temperatures, members or particles of refractory material are distributed throughout the length of the temperature responsive device. For a description in greater detail of such devices reference should be made to patent sepcifications Nos. 2,836,692 and 2,731,532 or the specification accompanying pending patent application Serial No. 24,514, now Patent No. 3,089,339 all of which are assigned to the present applicants.

It is to be understood that interrogation circuits in accordance with this invention are not limited to use with temperature responsive devices but may be used with any other means which are capable of being charged electrically to a substantial extent only under predetermined conditions, in order to determine the existance or absence of those predetermined conditions.

According to the present invention there is provided an electrical interrogation circuit for connection to means which are capable of receiving a substantial electrical charge only under predetermined conditions, wherein the circuit is switched cyclically from a first state in which it provides a charging potential for said means to a second state in which it can receive charge stored by said means during the preceding charging cycle whereby the receipt of charge during said second state is indicative of the existence of said predetermined conditions.

The invention also provides an electrical interrogation circuit adapted to be connected to means which, under predetermined conditions only, are capable of storing a substantial electric charge, wherein in order to determine the existence or otherwise of said predetermined conditions said circuit supplies a charging potential for application to said means and said circuit is arranged to indicate the storage of a charge by said means.

The invention will be better understood from the following description by way of example only, of several electrical circuits in accordance with the present invention and which are shown in the accompanying circuit diagrams.

Referring first to the circuit diagram of FIGURE 1, this will be described in the application to the interrogation of a temperature responsive device of the kind described in the aforesaid patent specifications, the temperature responsive device having two electrodes consisting of the outer conductive sheath 11 and an inner coaxially spaced conductor 10. The output terminals of the interrogation circuit are connected respectively to the conductors 10 and 11. When an alternating current supply flows in the primary winding of transformer $T_1$, the rectifier $D_1$ conducts on alternate half-cycles. If during these half-cycles the temperature responsive device is at an elevated temperature it is charged due to the potential applied between conductors 10 and 11. Current cannot flow in the transistor collector circuit because rectifier $D_2$ is non-conducting during these half-cycles. On the other half-cycles when rectifier $D_1$ is non-conducting discharge current flows from conductor 10 through resistor $R_2$ to the base of transistor $Tr1$ and via the emitter of transistor $Tr1$ to conductor 11. This results in an amplified collector-emitter current through the relay A, the rectifier $D_2$ and the lower portion of the secondary winding of transformer $T_1$. By choosing appropriate circuit components it can be arranged that relay A operates only when the temperature responsive device is at or above a predetermined temperature. The shunting of relay A by capacitor $C_1$ ensures that the relay remains operated during the half-cycles when rectifier $D_2$ is non-conducting, that is during the interrogation half-cycles when rectifier $D_1$ conducts and a charging potential is applied between conductors 10 and 11.

Figure 1:
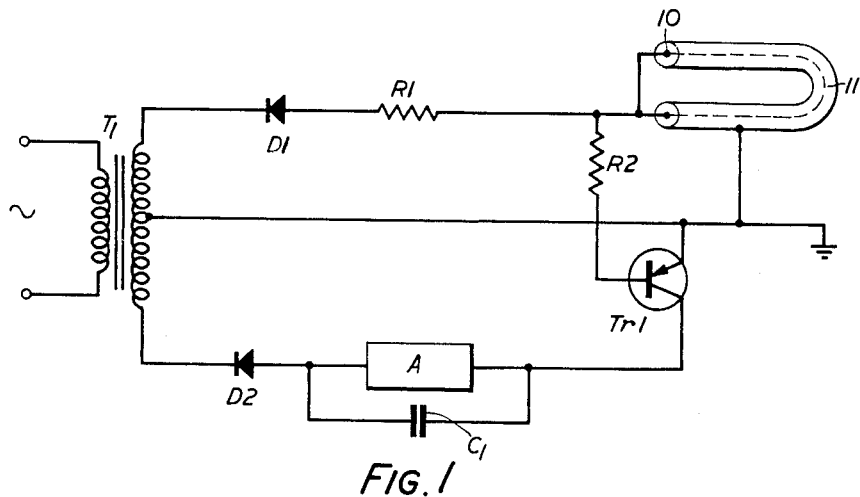
FIGURE 1 is a diagram of an interrogation circuit in accordance with the invention.

When connected to a temperature responsive device the circuit of FIGURE 1 (and also the circuits described hereafter) can be used to give either a warning of fire or overheat conditions or alternatively a warning of flame failure or fall in temperature. Thus, in the first role closure of contacts of the relay A as a result of energization of the relay A can be arranged to operate an indicating and/or warning device. In the second role the contacts may be normally open when the relay A is energised and closed when the relay A is de-energised, closure of the contacts being arranged to operate indicating or warning means and/or to control fuel supply to a burner whose flame is being monitored and/or some other burner. Resistor $R_1$ limits the current though the base-emitter circuit of the transistor as well as through rectifier $D_1$, and also protects rectifier $D_1$ in the event of a short circuit between conductors 10 and 11. Resistor $R_2$ regulates the discharge rate during the discharge half-cycles.

Figure 2:
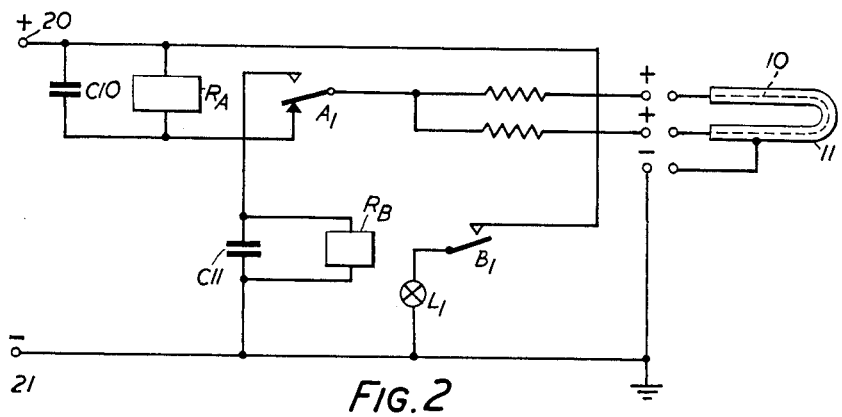
FIGURE 2 shows a modified interrogation circuit designed to operate with a direct current source.

If only a unidirectional current supply is available, a converter may be used to provide an alternating supply for feeding to the primary winding of transformer $T_1$. The converter may be a transistor oscillator energized from the unidirectional supply. Alternatively a circuit designed to operate from a unidirectional supply may be used and one possible circuit is shown in FIGURE 2, the supply being connected to positive and negative supply terminals 20, 21 respectively. Relay $R_A$ is connected via the normally made contact $A_1$, in series with the unidirectional supply between the inner conductor 10 and outer sheath 11. When the temperature responsive device is exposed to a predetermined temperature the charging current flowing between the conductors 10 and 11 is such that the relay $R_A$ operates, thereby switching contact $A_1$ to its normally open contact and thus connecting the moving coil relay $R_B$ between the conductors 10 and 11, the latter being disconnected from the charging potential. The charge stored prior to the movement of contact $A_1$ now causes a discharge current to flow through the moving coil relay $R_B$ which thereby operates to close normally open contact $B_1$ and illuminate a warning lamp $L_1$. Because the movement of the contact $A_1$ open-circuits relay $R_A$, this relay vibrates at a frequency dependent upon the capacitance of capacitor $C_{10}$. Thus, on alternate half cycle charging potential is applied between conductors 10 and 11 whilst during the other half-cycles discharge will occur through moving coil relay $R_B$ if the temperature responsive device is at elevated temperature during the charging half-cycles. Once operated relay $R_B$ will remain operated during the charging half-cycles due to its shunting by capacitor $C_{11}$.

Figure 3:
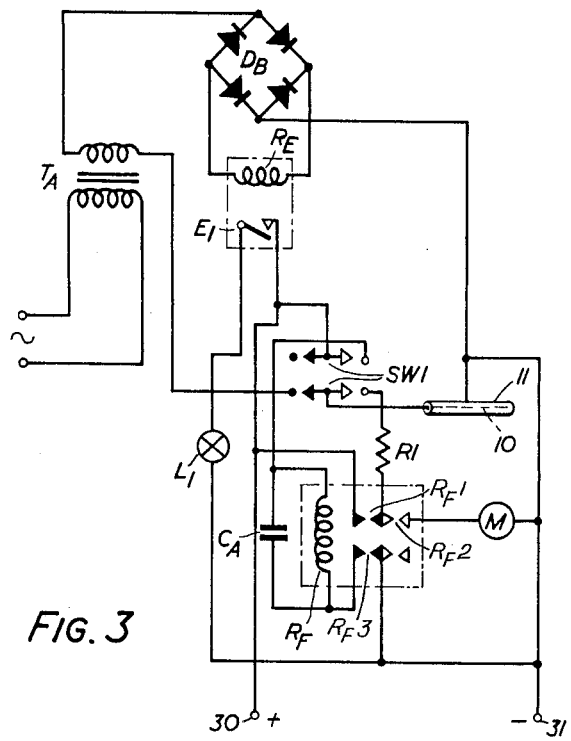

The circuit shown in FIGURE 3 depends for its operation upon the fact that temperature responsive devices of the kind described in the aforesaid patent specifications have an electrical resistance which falls with rising temperature. An alternating potential from the secondary winding of transformer $T_A$ is normally applied between the conductors 10 and 11 of the temperature responsive device and at a predetermined temperature the fall in resistance between the conductor 10 and 11 is such that the alternating current potential across the A.C. input diagonal of a rectifier bridge $D_B$ rises to a level at which the rectified potential across the output diagonal of the bridge operates relay $R_E$. The resultant closure of contact $E_1$ connects a warning lamp $L_1$ across a 24 volt unidirectional supply connected at terminals 30, 31 to illuminate the warning lamp $L_1$. In order to check that the warning lamp has been lit due to the temperature responsive device being exposed to elevated temperature, and not as a result of a short-circuit or leakage path, the hand-switch SW1 is thrown to the right thereby connecting relay $R_F$ across the 24 volt supply. In operating, relay $R_F$ opens the normally-made lower contacts $R_F3$ and thereby breaks its own operating circuit so that it vibrates at a frequency determined by the value of capacitor $C_A$. In its unoperated condition its normally-made upper contacts $R_F1$ connect the 24 volt supply across the conductors 10 and 11. Thus, charging will occur if, in fact, the illumination of the lamp $L_1$ was due to the temperature responsive device being at elevated temperature (in which condition it can be charged) and was not due to a short circuit or low-resistance shunt, the temperature responsive device not being at an elevated temperature and not therefore being in the condition at which it can receive a charge. In its operated condition its normally-open upper contacts $R_F2$ connect a meter M, or other indicating means, between the conductors 10 and 11 so that if there is any discharge current (which can only result from the temperature responsive device having been able to receive a charge because it was at elevated temperature), it will flow through meter M to confirm that the illumination of the warning lamp $L_1$ was due to exposure of the temperature responsive device to an elevated temperature. If no discharge current flows through meter M this will be an indication that the illumination of lamp $L_1$ was due to a short circuit or low resistance shunt. Opening of the normally-made lower contacts of the hand switch SW1 disconnects the alternating potential from across the conductors 10 and 11 so that contact $E_1$ opens and the warning lamp $L_1$ is extinguished. If the meter M is used to read voltage this will give an indication of the temperature to which the temperature responsive device is exposed, whilst if the meter is used to read current this will be indicative of the extent of the fire. Thus, an early indication is obtainable that the fire is diminishing or that the temperature is falling, for example as a result of appropriate remedial action having been taken.

Figure 4:
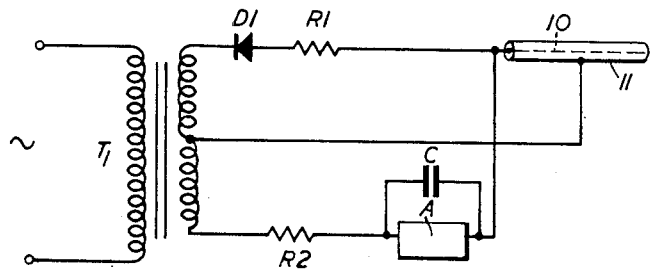
FIGURES 3, 4 and 5 illustrate still further modified interrogation circuits which fall within the scope of the invention.

Referring now to FIGURE 4, the secondary windings of the supply transformer $T_1$ are equal and are connected in opposition. During the half cycles when the polarity of the outer ends of the windings are negative with respect to the centre point, a negative charging potential is applied between conductors 10 and 11 from the two paralleled halves of the secondary winding. Under quiescent conditions, that is when the temperature responsive device is not heated, there is no discharge current through the direct current relay A which is shunted by capacitor C. During half cycles following charging half-cycles and when the temperature responsive device is at elevated temperature, the discharge current operates relay A. The rectifier $D_1$ prevents any positive potential from the transformer reaching relay A.

If the centre conductor 10 inadvertently becomes short-circuited, for example by moisture, only alternating current is produced which is shunted by capacitor C and insufficient current flows through the relay to cause false operation. The resistors $R_1$ and $R_2$ limit the alternating current to a safe value.

Figure 5:
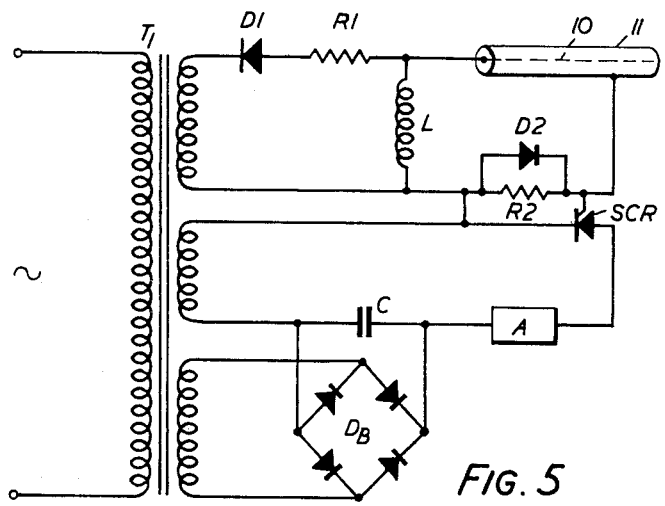

The circuit shown in FIGURE 5 employs a controlled solid-state rectifier SCR, such as a silicon controlled rectifier. On half-cycles of the alternating supply of one polarity rectifiers $D_1$ and $D_2$ conduct and a charging potential is applied between conductors 10 and 11 of the temperature responsive device. If during these half cycles the temperature responsive device is at an elevated temperature a charge is stored. During half-cycles of opposite polarity discharge current flows through resistor $R_2$ and inductor L and the potential difference developed across resistor $R_2$ is now of the correct polarity to switch the controlled rectifier SCR to its conductive state so that current through the middle secondary winding of the supply transformer $T_1$ energises the relay A. Resistor $R_1$ serves to limit the charging current. Rectifier $D_2$ by-passes resistor $R_2$ and the gate-cathode path of the controlled rectifier SCR during the charging half-cycles and protects the gate-cathode path from high reverse voltages.

The resistance value of resistor $R_2$ is chosen to switch the controlled rectifier SCR at a value of dischrage current corresponding to exposure of the temperature responsive device to a desired elevated temperature. The inductor L tends to maintain any current which has passed during a charging half-cycle and contributes to the subsequent discharge current through the controlled rectifier SCR.

The lowest secondary winding feeds a bridge rectifier $D_B$ whose rectified output is smoothed by capacitor C and provides a unidirectional bias voltage for the enegrising circuit of relay A. This bias voltage substantially cancels out the negative half-cycles of energising current and still enables the controlled rectifier SCR to be switched-off in the event of the potential across resistor $R_2$ falling below the switching value.

The resistor $R_1$ can be replaced by a relay of equal resistance. If a short-circuit occurs between conductors 10 and 11 the high current resulting will operate the relay which can be used to control a warning circuit indicating the occurrence of the short circuit.

An important feature of the present invention is that a short-circuit or low resistance leakage path across the terminals of the means which is capable of being charged electrically will prevent chagring of the means to any substantial extent and there will not be any discharge current to give false operation.

We claim:

1. In an electrical interrogation circuit for connection to a temperature responsive device adapted to receive a substantial electrical charge only when at elevated temperature, a source of charging potential, cyclically-operable switching means switchable cyclically between a first switching condition and a second switching condition, said switching means in said first switching condition electrically connecting said source of charging potential to said temperature responsive device and current responsive means, said switching means in said second switching condition disconnecting said source of charging potential from said temperature responsive device and electrically connecting said temperature responsive device to said current responsive means.

2. In electrical combination, an electrical interrogation circuit and a temperature responsive device, said temperature responsive device being adapted to receive a substantial electrical charge when at elevated temperature, said electrical interrogation circuit comprising a source of charging potential, cyclically operable switching means switchable cyclically between first and second switching conditions, and an electrical relay, said switching means when in said first condition electrically connecting said source to said temperature responsive device and when in said second condition electrically disconnecting said source from said temperature responsive device and electrically connecting said temperature responsive device to said electrical relay for discharge through said electrical relay of any charge stored in said temperature responsive device.

3. An electrical interrogation circuit in electrical combination with a temperature responsive device, said temperature responsive device having input terminals and being electrically chargeable by a substantially greater amount when hot than when cold, said interrogation circuit comprising a transformer having a primary winding adapted to be connected to a source of alternating potential and a tapped secondary winding providing first and second output windings, first rectifying means electrically connected in series circuit with said first output winding and said input terminals, said first rectifying means conducting on half-cycles of said alternating potential of one polarity, a transistor having a base connection, an emitter connection and a collector connection, an electrical relay and second rectifying means, said second rectifying means conducting on half cycles of said alternating potential of polarity opposite to said one polarity and being electrically connected in series with said relay and said second output winding between said emitter connection and said collector connection, said input terminals being connected respectively to said base connection and said emitter connection.

4. A circuit according to claim 3 further comprising indicating means, energisation of said relay operating said indicating means for indicating that said temperature responsive device is hot.

5. In an electrical interrogation circuit electrically connected to the input termnials of temperature responsive charge storage means, said temperature responsive charge storage means storing a substantially greater electrical charge when at elevated temperatures than when at low temperatures, a source of alternating current, first rectifying means, second rectifying means having first, second and third electrodes, said first electrode controlling the passage of current between said second and third electrodes in dependence upon the potential difference between said first electrode and said second electrode, said source being electrically connected to said temperature responsive means through said first rectifying means for applying a charging potential to said temperature responsive means during conduction of said first rectifying means, said first and second electrodes being electrically connected to said temperature responsive means for energisation by unidirectional current discharging from said temperature responsive device when said first rectifying means is non-conductive, and current responsive means, said current responsive means being electrically connected in series with said source and said second and third electrodes.

6. A circuit according to claim 5, wherein said second rectifying means is a silicon controlled rectifier.

7. In electrical combination, a temperature responsive device, an electrical relay, a capacitor, a source of alternating current and rectifying means, said source being connected to said temperature responsive device through said rectifying means for applying a charging potential to said temperature responsive device during conduction of said rectifying means, said electrical relay being connected to said temperature responsive device for energisation by unidirectional current discharging from said temperature responsive device, said capacitor being electrically connected in parallel with said relay to by-pass from said relay alternating current resulting from short circuiting of said temperature responsive device.

8. In electrical combination, a temperature responsive device, electrically operated switching means, a capacitor, a source of alternating current and rectifying means, said source being connected to said temperature responsive device through said rectifying means for applying a charging potential to said temperature responsive device during conduction of said rectifying means, said electrically operated switching means being connected to said temperature responsive device for energisation by unidirectional current discharging from said temperature responsive device, said capacitor being electrically connected in parallel with said electrically operated switching means to by-pass from said electrically operated switching means alternating current resulting from short circuiting of said temperature responsive device.

9. An overheat warning system comprising a cable-like element having two electrical conductors separated by a material whose electrical resistance falls with rising temperature, said element being adapted to receive a substantial electrical charge when at a temperature at which warning of overheat is required, an electrical transformer having a primary winding and a secondary winding having a centre tapping, a source of alternating current connected to said primary winding, current rectifying means, and current operated overheat warning means, one of said two electrical conductors being connected through said rectifying means to one end of said secondary winding and the other of said two electrical conductors being connected to said centre tapping whereby when said element is at elevated temperature a charging current passes between said two conductors during those half-cycles of alternating current whose polarity is such that said rectifying means is conductive, the aforesaid one of said two electrical conductors also being connected through said current operated overheat warning means to the other end of said secondary winding whereby during those half-cycles of alternating current whose polarity is such that said rectifying means is non-conductive any charge stored in said element during the preceding half-cycle of opposite polarity produces a discharge current through said current operated overheat warning means to effect a warning of overheat.

10. An overheat warning system comprising a cable-like element having two electrical conductors separated by a material whose electrical resistance falls with rising temperature, said element being adapted to receive a substantial electrical charge when at a temperature at which warning of overheat is required, an electrical transformer having a primary winding and a secondary winding, a source of alternating current connected to said primary winding, current rectifying means, and current operated overheat warning means, said two electrical conductors being connected in circuit with said rectifying means and said secondary winding whereby when said element is at elevated temperature a charging current passes between said two conductors during those half-cycles of alternating current whose polarity is such that said rectifying means is conductive, said two electrical conductors also being connected to said current operated overheat warning means whereby during those half-cycles of alternating current whose polarity is such that said rectifying means is non-conductive any charge stored in said element during the preceding half-cycle of opposite polarity produces a discharge current through said current operated overheat warning means to effect a warning of overheat.

References Cited by the Examiner

UNITED STATES PATENTS

| | | | |
|---|---|---|---|
| 2,567,018 | 9/51 | Grob | 317—151 X |
| 2,828,450 | 3/58 | Pinckaers | 317—132 X |
| 2,836,692 | 5/58 | Griffiths | 338—26 |
| 2,906,928 | 9/59 | Klein | 317—132 X |
| 2,960,159 | 11/60 | Holstein | 317—132 X |
| 3,014,159 | 12/61 | Frank | 317—148.57 |

OTHER REFERENCES

Publication: "Anticipating Thermocouple for Close Temperature Control," R. L. Longini, Product Engineering, January 1944, page 49.

SAMUEL BERNSTEIN, *Primary Examiner.*